June 18, 1940.  E. M. SORENSEN  2,204,628
BLIND LANDING SYSTEM
Filed Jan. 28, 1938  4 Sheets-Sheet 1
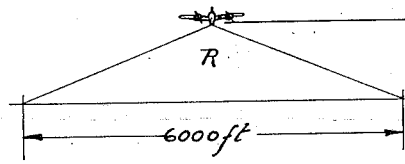
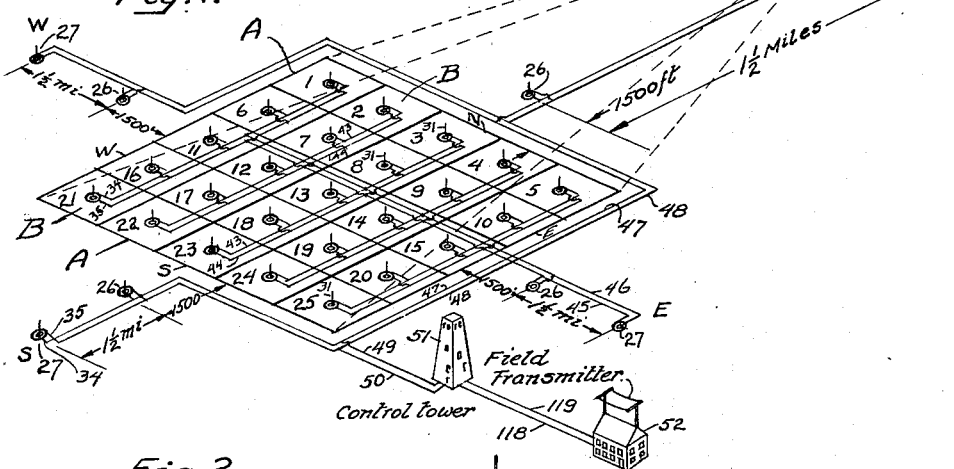
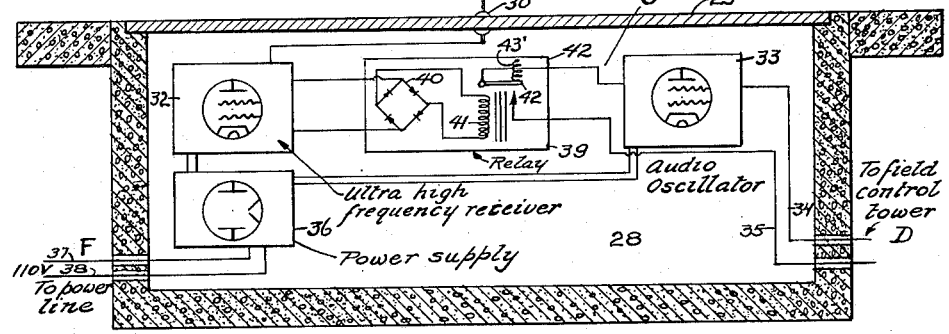
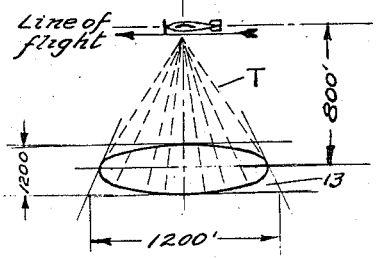
Inventor
Edward M. Sorensen
By Adam Richmond
Attorney June 18, 1940.     E. M. SORENSEN     2,204,628
BLIND LANDING SYSTEM
Filed Jan. 28, 1938     4 Sheets-Sheet 2
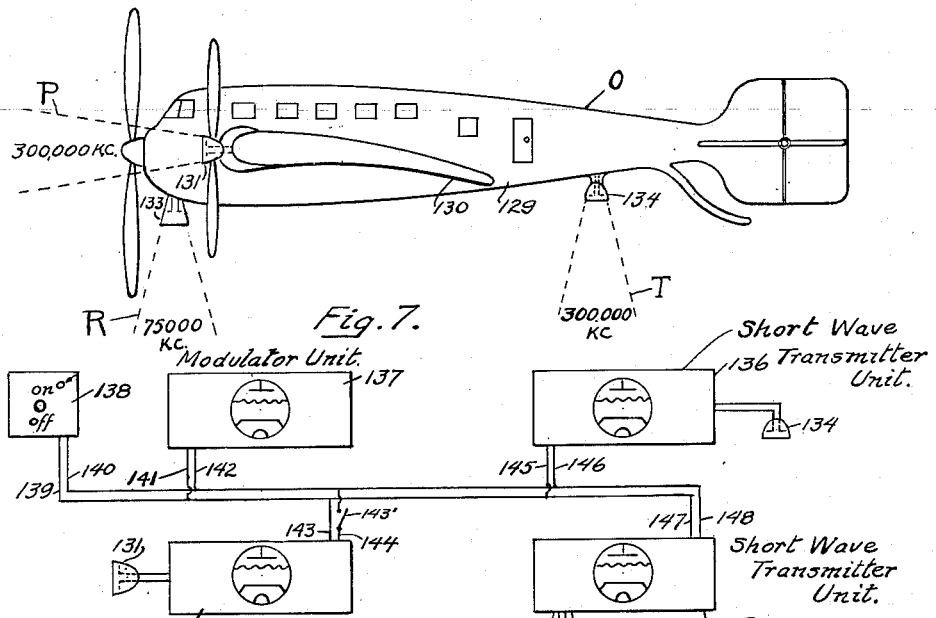
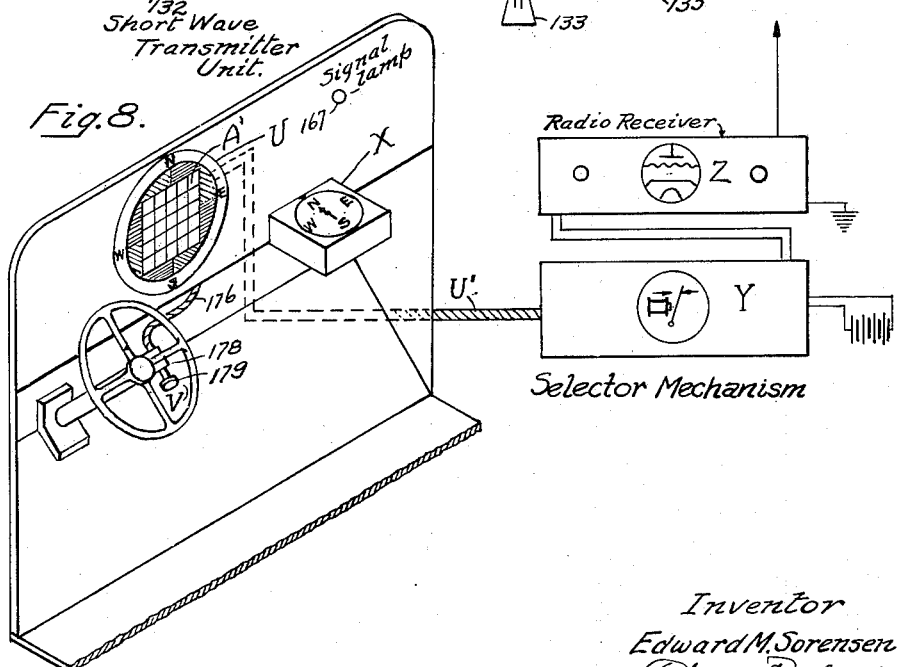
Inventor
Edward M. Sorensen
By (signature)
Attorney

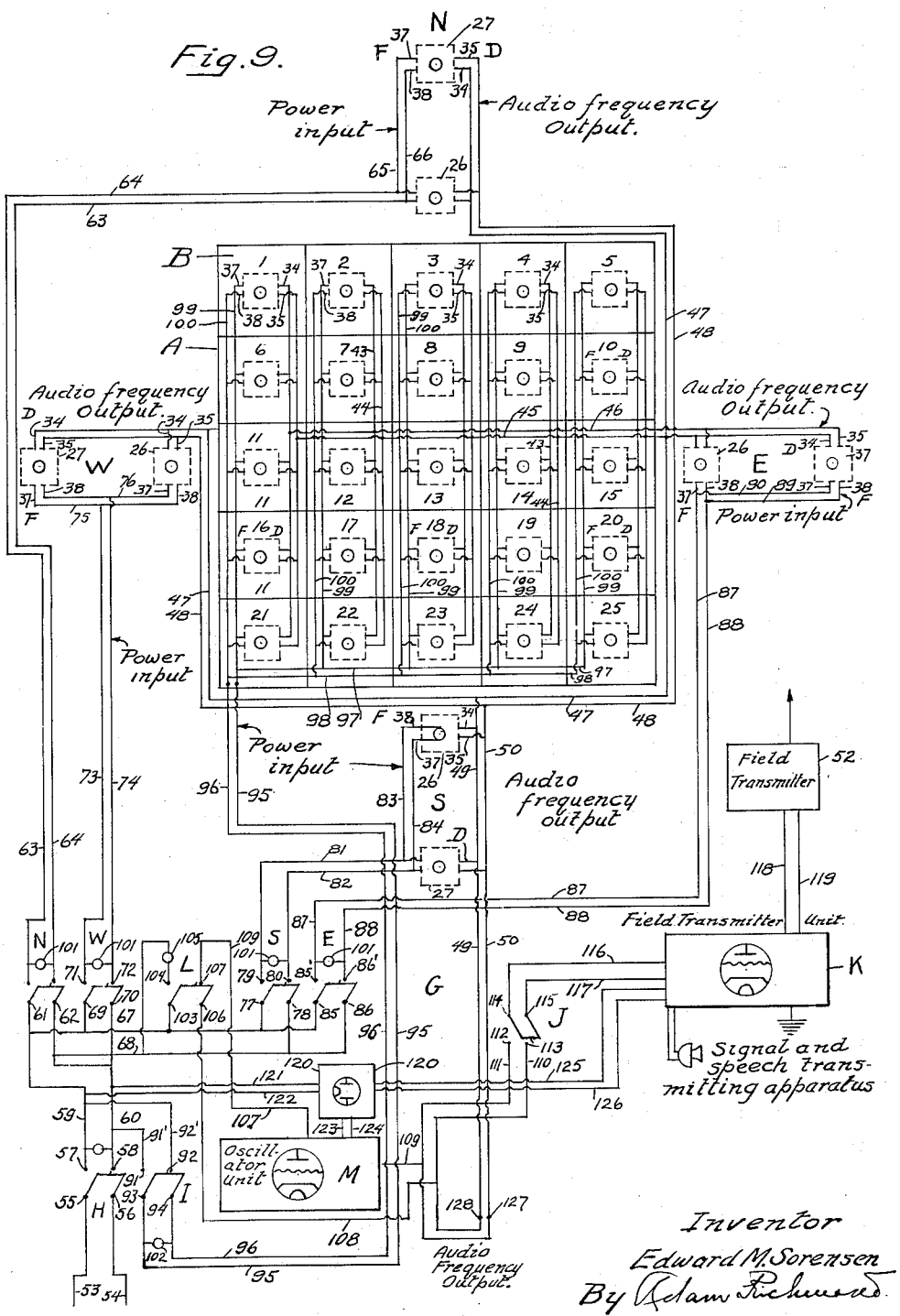

June 18, 1940.                E. M SORENSEN                2,204,628
                            BLIND LANDING SYSTEM
                    Filed Jan. 28, 1938        4 Sheets-Sheet 4
Fig. 10.
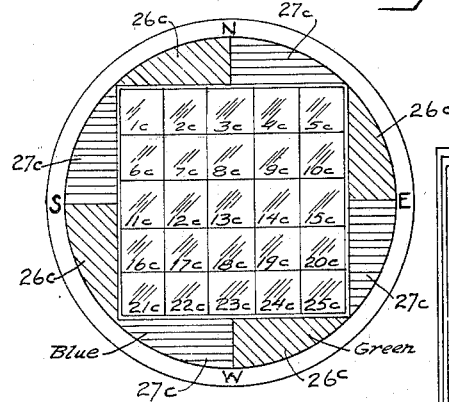
Fig. 12.
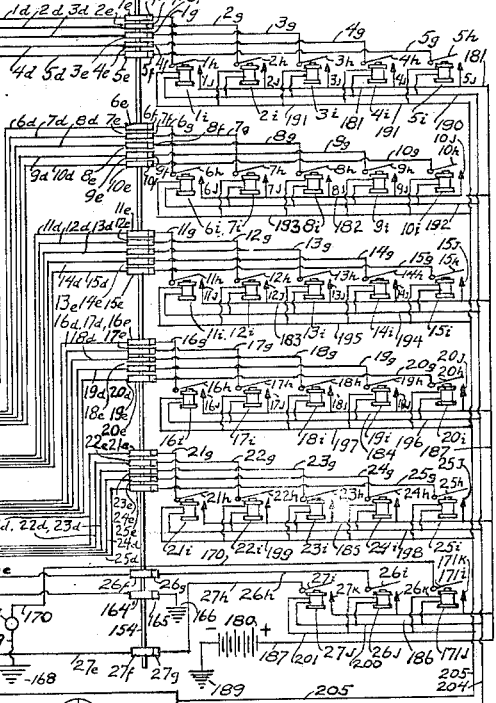
Fig. 11.
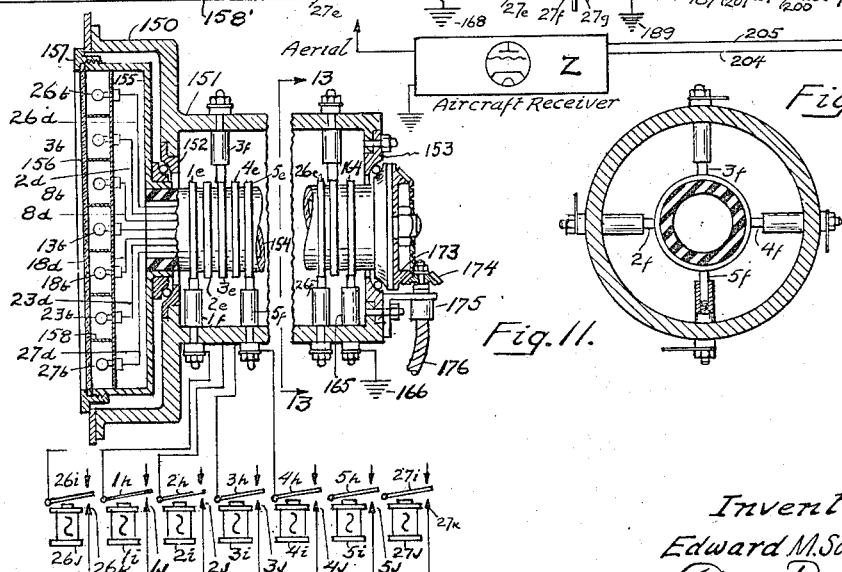
Fig. 13.
Inventor
Edward M. Sorensen
By Adam Richmond
Attorney Patented June 18, 1940

2,204,628

UNITED STATES PATENT OFFICE 2,204,628

BLIND LANDING SYSTEM

Edward M. Sorensen, Wright Field, Ohio

Application January 28, 1938, Serial No. 187,439

14 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates broadly to a navigational guide for assisting a pilot in effecting a blind landing; more especially it is directed to a system and apparatus whereby under conditions of poor or of no visibility, the pilot of an aircraft, through the instrumentality of an automatically operated signal responsive apparatus aboard the aircraft will be informed regarding the position of the aircraft with reference to various marker and field receiver stations located adjacent to and within the boundaries of a landing field.

One object of this invention is to provide an improved aeronautical guide system and apparatus whereby the pilot of an aircraft, regardless of visibility conditions, may make a safe and accurate landing from any one of four approaches to a landing field, depending upon the direction of the prevailing wind, by heading the aircraft toward a selected area on the landing field, and shown on the screen of an automatically operated signal responsive indicator located aboard the aircraft and in front of the pilot.

Another object of this invention is to provide a navigational aid for making blind landings wherein a rectangular field is laid out in squares, each including a field receiver station comprising a vertically disposed antenna connected with a receiver unit responsive to a predetermined frequency and housed in a subterranean compartment, and wherein each receiver unit controls a local audio oscillator operating at a predetermined frequency and having its audio frequency output connected to a speech and signal transmitting unit common to all of the stations and located in a control tower positioned adjacent the landing field, whereby as the antenna systems of the various receiver units are impinged by radiations propagated by short wave transmitters located aboard the aircraft and transmitting at a frequency to which the receiver units are responsive, the output of the speech and signal transmitting unit will be modulated at different audio frequencies for the purpose of controlling the operation of a signal responsive position indicator located on the aircraft.

Another object of this invention is to provide a system and apparatus of the character described wherein a pair of marker receiver stations responsive to a predetermined frequency are disposed in spaced relation along each of the lines bisecting the boundaries of a rectangular landing field and wherein the landing field is divided into a series of equally dimensioned areas each of which contains a field receiver station tuned to a predetermined frequency and adapted to control a local audio oscillator operating at a predetermined frequency, the audio frequency output of the various oscillators being connected to a common field transmitting system whereby as the antenna systems of the various marker and receiver units are impinged by radiations from short wave transmitters located aboard an aircraft and transmitted at frequencies to which the receiver and marker units are responsive, the output of the field transmitting system will be modulated at different audio frequencies for the purpose of controlling the operation of a signal responsive position indicator located on the aircraft.

Another object of this invention is to provide a system and apparatus of the character described wherein an aircraft is provided with means for transmitting short wave radiations at different frequencies in different directions, and with different radiation patterns, whereby depending upon the frequency of the short wave emanations, the direction of the propagation, their pattern and the position of the aircraft relative to the landing field, suitable signal responsive apparatus on the landing field will be controlled to effect modulation of the field transmitter output at different audio frequencies for the purpose of selectively illuminating various areas on a transparent facsimile of the landing field and thereby informing the aircraft pilot regarding the position of the aircraft relative to the landing field and to a particular area on the field toward which the plane may be directed for a safe landing.

With these and other objects in view, this invention consists in certain novel details of construction, combination and arrangement of parts to be more particularly hereinafter described and claimed.

Although the novel features which are believed to be characteristic of this invention will be particularly pointed out in the claims appended hereto, the invention itself as to its objects and advantages, the mode of its operation and the manner of its organization may be better understood by referring to the following description taken in connection with the accompanying drawings forming a part thereof in which—

Fig. 1 is a perspective view of the landing field, showing its layout, the arrangement of the marker and field receiver stations and illustrating the radiation pattern of the short wave radio beam transmitted from the aircraft for the purpose of controlling the operation of the field receiver stations when the aircraft is above the mile and a quarter marker receiver station;

Fig. 2 is a transverse vertical section partly in elevation of the underground compartment used to house the short wave receiver unit, the local audio oscillator, the electro-magnetically controlled means for controlling the output of the oscillator and the power supply, all of which are diagrammatically shown within the compartment;

Fig. 3 is a side elevation of an airplane showing the radiation pattern of one of the short wave beams adapted to be projected from the aircraft normal to its line of flight and illustrating a fragment of the landing field and the area covered by the beam when the aircraft is at an altitude of 800 feet;

Fig. 4 is a front elevation of an airplane illustrating the radiation pattern of the marker control beam transmitted from the airplane, normal to its line of flight and illustrating the width of the beam at an altitude of 800 feet;

Fig. 5 is a side view of the airplane and beam shown in Fig. 4 and illustrating the breadth of the beam when the airplane is at an altitude of 800 feet;

Fig. 6 is a side elevation of an airplane showing the arrangement of the three short wave transmitters on the plane and the direction of their transmitter beams;

Fig. 7 is a diagrammatic view of the three transmitter units, their modulator and the switch for controlling the simultaneous operation of the assembly;

Fig. 8 is a perspective view of the instrument board of an aircraft, showing the mounting of the position indicator, a compass, the remote control on the steering wheel for orienting the indicator with respect to compass indications, and illustrating diagrammatically the selector mechanism casing and its connections with the output of a conventional receiver;

Fig. 9 is a diagrammatic view of the landing field, the marker and receiver stations and the electrical connections between the marker and field receiver stations, the control panel and the signal and speech transmitter equipment in the control tower;

Fig. 10 is a front elevation of the position indicator showing its transparent panel blocked-off to afford a facsimile of the landing field layout, the blocked-off portion being surrounded with colored segmental portions to indicate different marker receiver stations;

Fig. 11 is a transverse vertical section of the position indicator and its casing, a portion of which is broken away and showing the manner of rotatably mounting the indicator within the casing, the means to the rear of the transparent panel of the indicator, the commutator rings for supplying electrical energy to the illuminating means, the brushes coacting with the commutator rings, and illustrating the electrical connections between the brushes and certain of the electro-magnetically controlled switches of the selector mechanism;

Fig. 12 is a diagrammatic view illustrating the position indicator, the arrangement of its incandescent signal lamps, the electro-magnetically controlled selector mechanism, the electrical connections between the selector mechanism and the incandescent signal lamps of the indicator, and the conventional receiver, the audio output of which is connected with the selector mechanism; and Fig. 13 is a transverse vertical section taken on the line 13—13 of Fig. 11, looking in the direction of the arrows.

For the sake of convenience and to simplify description, this invention will be discussed under the headings—Landing field arrangement and receiver stations; Landing field control tower and transmitting equipment; Transmitter assembly aboard aircraft; Position indicator; Selector mechanism; Operation and conclusion. These components will be considered in the order of their enumeration.

*Landing field arrangement and receiver stations.*—According to the instant invention and referring to Fig. 1 of the drawings, A represents a rectangular landing field laid out to provide a series of squares B, each of which defines an area 1200 feet square. In the center of each square is a field receiver station, and these stations are designated 1 to 25 inclusive. At a point approximately 1500 feet from each of the landing field boundaries (designated N, W, S and E and corresponding to the north, west, south and east approaches to the field) is a marker station 26. Aligned with each station 26 but located a mile and a half distant, is a marker receiver station 27. The respective field and marker receiver stations each consist of an underground compartment 28 having a suitable closure 29 which is centrally formed with an antenna mounting 30 designed to vertically support an antenna 31 having an electrical height of approximately 18 inches. The antenna mounting 30 and the construction of the antenna are such as to permit the antenna to be deflected on impact and after impact to assume its normal vertical position.

Within compartment 28 is a receiving and a signal producing assembly C, including a short wave receiver 32 connected to antenna 31 and permanently tuned so as to respond to short wave signals transmitted at a predetermined frequency; an audio oscillator 33 adapted to oscillate at a predetermined audio frequency and which feeds into the audio frequency output lines 34 and 35 extending through one side of compartment 28, hereinafter to be referred to as the audio frequency side D of the receiver station; a power unit 36 connected to the power supply lines 37 and 38 entering the opposite side of compartment 28, hereinafter to be referred to as the power input side F of the receiver station.

The output of power unit 36 is connected to the receiver unit 32 and to audio oscillator 33 to supply their plate, filament and grid circuits respectively. Between the receiver unit 32 and audio oscillator unit 33 is an oscillator control unit 39 including a dry disk rectifier 40, an electro-magnet 41 and a circuit breaker 42 included in the output circuit of the audio oscillator, so as to open and close the audio frequency output circuit of the oscillator 33, when the rectified output of receiver 32 energizes electro-magnet 41 and closes circuit-breaker 42 normally held in an open position by spring 43'.

As the assembly C within compartment 28 is of conventional design, it forms no part of the instant invention except in so far as it functions to produce, by means of oscillator 33, a signal at a desired audio frequency, when the receiver unit 32 responds to a signal transmitted from an aircraft, hence the various units within the compartment 28 and their electrical connections have been symbolically designated to indicate that when antenna 31 has been impinged by a radio beam modulated at the frequency to which receiver unit 32 is responsive, the rectified output of the receiver unit functions to energize the electro-magnet 41 so as to close circuit-breaker 42 and complete the output circuit of the audio oscillator 33 through lines 34 and 35 to the field control tower hereinafter to be referred to.

In order to connect the audio frequency output of all of the receiver stations numbered 1 to 25 inclusive, to a single control tower, the audio frequency lines 34 and 35 on the audio frequency side D of each of the field receiver stations (see Figs. 1, 2 and 9) are connected to bus-lines 43 and 44 and these are connected to bus-lines 45 and 46 which in turn are connected to bus-lines 47 and 48 connecting with lines 49 and 50 extending to a control panel G within the control tower 51 hereinafter to be referred to. Likewise, the audio frequency output lines 34 and 35 on the audio frequency side D of the marker stations 26 and 27 are connected to bus-lines 47 and 48 which in turn connect with lines 49 and 50, so that the audio frequency output of the various marker stations may be conducted to the panel in the control tower 51 via the lines 49 and 50, common to the output of both the field and the marker receiver stations, as clearly shown in Figs. 2 and 9 of the drawings.

Although the field and marker receiver stations are structurally identical, they differ in respect to—

(a) Their response, that is to say, all of the field receivers are adjusted to respond to a short wave transmitted at a frequency of 300,000 kilocycles per second, while all of the marker receiver stations are tuned to a frequency of 75,000 kilocycles per second, and (b) The manner of supplying power to the power units 36 in compartment 28, as will be hereinafter described.

From the preceding description, it will be apparent that when the antennas of the field receiver stations are impinged by a short wave signal transmitted at a frequency of 300,000 kilocycles per second, their oscillators will be started to produce signals at audio frequencies $N^1-N^{25}$ for a purpose hereinafter to be described.

*Landing field control tower and transmitting equipment.*—At a suitable point adjacent the landing field A is a control tower 51 the output of which, modulated at a predetermined signal frequency, is adapted to be transmitted to a field transmitter station 52, as clearly shown in Figs. 2 and 9 of the drawings. Within control tower 51 is a distributing panel G upon which is mounted a master power supply switch H, controlling the power supply from power mains 53 and 54 to the panel G and its associated parts; a field receiver power switch I controlling the power supply from the panel G to the field receivers; an audio frequency switch J connecting the audio frequency output of the receiver stations with the signal and speech transmitting apparatus K; marker station power supply switches N, W, S and E controlling the supply of power to the marker receiver stations situated at the north, west, south and east approaches to the landing field A, and a combination signal and oscillator control switch L, for closing a signal lamp circuit and connecting the output of oscillator unit M with the transmitting apparatus K.

The double pole power supply switch H has its terminals 55 and 56 connected to power supply mains 53 and 54, and its remaining terminals 57 and 58 connected via conductors 59 and 60 with terminals 61 and 62 of the double pole marker power supply switch N, the remaining terminals of which are connected via conductors 63 and 64, 65 and 66, and 37 and 38, to the power input side F of the marker receiving stations 26 and 27, located at the north approach of the landing field A.

To distribute the power supply from conductors 59 and 60 to the marker power supply switches W, S and E, said conductors are connected with bus-bars 67 and 68 and to these are connected the terminals 69 and 70 of switch W. The remaining terminals 71 and 72 of this switch are connected via conductors 73 and 74, 75 and 76, and 37 and 38, with the power input side F of marker receiver stations 27 and 26, on the west approach to the landing field A.

Marker station power supply switch S has its terminals 77 and 78 connected to bus-bars 67 and 68 and the remaining terminals 79 and 80, connected via conductors 81 and 82, 83 and 84, and 37 and 38 with the power input side F of the marker receiver stations 26 and 27, located at the south approach to the landing field A.

Marker station power supply switch E has its terminals 85 and 86 connected to bus-bars 67 and 68, and the remaining terminals 85' and 86' connected via conductors 87 and 88, 89 and 90 and 37 and 38, with the power input side F of markers 26 and 27, located at the east approach of landing field A.

With this circuit arrangement, it will thus be seen, assuming that switch H has been closed, power may be supplied from mains 53 and 54 through switches N, W, S, E to any selected pair of marker receiver stations, thus permitting the operator in the tower 51 to selectively determine the operation of the marker receiver stations at the north, west, south and east approaches to the field in accordance with the direction of the prevailing wind.

To supply power to the field receiver stations 1 to 25 inclusive, field power switch I has its terminals 91 and 92 connected via conductors 91' and 92', with conductors 59 and 60, and the remaining terminals 93 and 94 connected via conductors 95 and 96 with conductors 97 and 98, in the landing field A. Conductors 97 and 98 are connected with distributing conductors 99 and 100 to which are connected conductors 37 and 38 on the power input side F of the various field receiver stations, as clearly shown in Figs. 2 and 9 of the drawings. When the double pole switch I, has been closed, power will be supplied from the mains 53 and 54 through switches H and I and conductors 59 and 60, 91' and 92', and 95 and 96, field conductors 97 and 98, distributing conductors 99 and 100 and conductors 37 and 38 to all of the receiver stations.

To inform the operator at the control tower with respect to the operation of the marker receiver stations, a signal lamp 101 is located above each of the switches N, W, S and E and connected across each of the power supply conductors 63 and 64, 73 and 74, 81 and 82, and 87 and 88 extending from said switches to the N, W, S and E marker stations, so that when any pair of these stations is in operation, the signal lamp will be lighted. Likewise, if desirable, a similar signal lamp 102 may be placed across the power supply lines 95 and 96 extending from switch I to the field receiver stations, so as to indicate that the field stations are in operative condition. To control the operation of oscillator M and at the same time flash a signal when said oscillator is in operation, double pole switch L has two of its terminals 103 and 104 connected to bus-bars 67 and 68 through a signal lamp 105 so that when the switch is closed one of its blades will close the circuit of the lamp. The remaining terminals 106 and 107 of switch L are included in the audio frequency output circuit of an oscillator M, whereby when switch L has been closed the other blade of said switch will close the output circuit of oscillator M. The audio frequency output circuit of oscillator M, graphically designated by conductors 109, 107 and 108, is adapted to be connected to the audio frequency input, conductors 110 and 111 of the signal and speech transmitting apparatus K, as clearly shown in Fig. 9 of the drawings. To control the input of transmitting apparatus K, said input circuit is provided with a double throw control switch J, having its terminals 112 and 113 connected to lines 110 and 111, and its remaining terminals 114 and 115 connected to the lines 116 and 117 entering apparatus K. The output of apparatus K modulated at signal frequency is adapted to be transmitted to field transmitter 52 (via the conductors 118 and 119.

According to the panel arrangement which has just been described, it will be manifest, the operator in the signal tower may control the power supply to the marker receiver stations 26 and 27 by means of switches H, N, W, S and E and to all of the field receiver stations by switch I. Likewise by double pole switch L, the output of oscillator M may be connected to the input of the signal and speech transmitting apparatus K to cause the latter to transmit signals modulated at the frequency of the oscillator M for a purpose to hereinafter appear.

A power unit 120 is connected with the power supply lines 59 and 60 via conductors 121 and 122 and with the oscillator M, signal and speech transmitting apparatus K, via the conductors 123 and 124, and 125 and 126 to supply the plate, filament and grid circuits of the oscillator and transmitting apparatus K, as will be understood without further discussion.

To transmit the audio frequency signals from the marker and the field receiver stations to the transmitting apparatus K within the control tower, the audio frequency output conductors 49 and 50 extending from the landing field A to the control tower 51, are connected to terminals 127 and 128 on panel G, as clearly shown in Fig. 9 of the drawings. As these terminals 127 and 128 are also connected with conductors 110 and 111 of the transmitting apparatus K, it will be apparent that signals coming into the control tower from the field will be transmitted via conductors 110 and 111, switch J and conductors 116 and 117 to transmitting apparatus K, and will modulate the output of the transmitting apparatus at the frequency of the incoming signal, as will be readily understood without further discussion.

Inasmuch as the power unit 120, oscillator M and transmitting apparatus K are of conventional design and form no part of the present invention, except in so far as they serve to produce oscillations of a predetermined frequency and to transmit the signals entering the tower from the field, said power unit oscillator M, transmitting apparatus K and their associated input and output circuits have been symbolically designated.

*Transmitter assembly aboard aircraft.*—Coming now to the transmitter equipment aboard the aircraft and by means of which short wave signals are transmitted from the aircraft in different directions at different frequencies and in the form of radio beams having different radiation patterns, reference being had to Figs. 6 and 7 of the drawings, there is shown an aircraft O including a fuselage 129 and a wing 130. Suitably mounted in the leading edge of the wing 130 is a transmitting radiator 131 which is connected to a short wave transmitter unit 132, the latter being adapted to transmit at a frequency of 300,000 kilocycles per second. The design of radiator 131 is such as to project a radio beam in the direction of the line of flight, the beam having a radiation pattern conforming to that shown in Fig. 1 of the drawings. At a distance of a mile and a half from the field boundaries and at an altitude of 800 feet, the spread of this beam will correspond to the width of the landing field, which in the present instance is 6,000 feet, as shown in Fig. 1 of the drawings. This beam constitutes what hereinafter will be referred to as the landing beam P.

Arranged in the bottom of the airplane in suitably spaced relation are two radiators 133 and 134. These radiators are positioned so as to project their beam in a direction normal to the line of flight and are connected to short wave transmitter units 135 and 136 respectively. Transmitter unit 135 connected with radiator 133 is adapted to transmit at a frequency of 75,000 kilocycles per second. The design of radiator 133 is such as to project a short wave radio beam having a radiation pattern which at an altitude of 800 feet will be wide enough to extend across the field, that is to say, the spread of the beam at the height mentioned, will cover an area 6,000 feet wide, as shown in Fig. 4 of the drawings. This beam hereinafter will be referred to as a marker station beam R.

The transmitter unit 136 connected with radiator 134 transmits at a frequency of 300,000 kilocycles per second and its radiator is equipped with a parabolic reflector so as to project a short wave radio beam having a conical radiation pattern, hence when the plane is at an altitude of 800 feet, the beam will cover substantially one of the squares of the landing field, as clearly shown in Fig. 3 of the drawings. This beam hereinafter will be referred to as the field receiver station beam T.

The three short wave transmitter units 132, 135 and 136 are adapted to be modulated by a single modulator unit 137. The operation of these units and of the modulator is adapted to be controlled by switches 138 and 143' included in the circuits represented by conductors 139 and 140, extending from switch 138; conductors 141 and 142 connected with the modulator and extending from conductors 139 and 140 to modulator 137; conductors 143 and 144 extending from conductors 139 and 140 to transmitter unit 132; conductors 145 and 146 extending from conductors 139 and 140, to transmitter unit 136, and conductors 148 and 147 extending from conductors 139 and 140 to transmitter unit 135. These connections are such that when switch 138 has been closed, the two transmitters 135 and 136 and modulator unit 137 will be operated to project the beams R and T. Switch 143' enables separate operation of transmitter unit 132 and the projection of beam P.

As the modulator and transmitter units just mentioned, are of conventional design and hence form no part of the instant invention, except in so far as they function to provide the short wave beams P, R and T, these units and their connections have been symbolically shown in Fig. 7 of the drawings.

With the three transmitters and their radiators arranged on the aircraft as shown in Figs. 6 and 7, it will be seen that when switch 138 has been closed radiator 133 will project a marker station beam R normal to the line of flight and at a frequency of 75,000 kilocycles per second; radiator 134 will project a beam T, likewise normal to the line of flight and at a frequency of 300,000 kilocycles per second. When switch 143' has been closed radiator 131 will project a beam P in the direction of the line of flight and at a frequency of 300,000 kilocycles per second.

These three beams P, R and T are adapted to control the operation of the field and marker receiver stations hereinbefore described.

*Position indicator.*—Mounted on the instrument board of the aircraft in view of the pilot is a position indicator U having a rotatable finder A' adapted to be oriented with respect to the landing field A and the indications of the compass X. The rotary movement of finder A' is effected by a remote control device V mounted on the steering wheel or other convenient part of the aircraft. Indicator U is electrically connected by cable U' with a selector mechanism Y which latter is controlled by and connected with the audio frequency output of a conventional receiver Z suitably located aboard the aircraft, as shown in Fig. 8 of the drawings.

Indicator U comprises an outer cylindrical housing 150 adapted to be fitted into a suitably dimensioned opening in the instrument board. Housing 150 is formed with a cylindrical extension 151 interiorly provided with aligned bearing openings 152 and 153 adapted to suitably journal shaft 154 supporting an inner annular casing 155, positioned within the housing. Casing 155 is adapted to be closed by a translucent glass panel 156 held in position by a metal retainer ring 157, as clearly shown in Fig. 11 of the drawings.

Interiorly, the inner casing 155 is divided by the intersecting partitions 158 into a series of square compartments numbered 1a to 25a inclusive. In addition to the squares 1a to 25a inclusive, partitions 158' provide a plurality of segmentally shaped compartments 26a and 27a extending around the area occupied by the squares, as clearly shown in Fig. 12 of the drawings. In each of the squares 1a to 25a inclusive, is an incandescent lamp, the lamps in the various squares being numbered 1b to 25b inclusive. In each of the four segmentally shaped compartments is an incandescent lamp and these are designated 26b and 27b respectively.

When viewed through translucent panel 156 the edges of partitions 158' and 158 underlying the panel 156, outline a plurality of segmentally shaped portions 26c and 27c (Fig. 10) which surround a rectangular area divided into a series of squares numbered 1c to 25c inclusive (Fig. 10), thus providing a finder A' affording a facsimile of the squares on the landing field containing the field receiver stations hereinbefore identified as 1 to 25 inclusive.

The segmental portions designated 26c and 27c of the finder A' extending around the rectangular area, are colored green and blue respectively, that is to say, the segmental portions of the finder overlying the similarly shaped compartments 27a are colored blue and those overlying compartments 26a are colored green, as clearly shown in Fig. 10 of the drawings. With this arrangement a white light will be flashed in each of the squares 1c to 25c inclusive, representing the field receiver stations 1 to 25, a blue light for each of the segments 27c indicating the 1500 marker receiver stations 26, and a green light for each of the segments 26c, indicating the mile and a half marker receiver stations 27.

To energize the incandescent lamps 1b to 25b inclusive, one side of each of said lamps is connected via conductors 1d to 25d inclusive, with commutator rings 1e to 25e inclusive, mounted on shaft 154. The other side of these lamps (1b to 25b inclusive) is connected to ground via the five distributing conductors 159, 160, 161, 162 and 163, common return conductor 164, commutator ring 164' on shaft 154, brush 165 and ground 166, as clearly shown in Figs. 11 and 12 of the drawings. Likewise one side of each of the incandescent lamps 27b in segmental compartments 27a is connected via the four branch conductors 27d and the distributing conductor 27e with commutator ring 27f on shaft 154. The remaining side of each of the incandescent lamps 27b is connected to ground via the four branch conductors 27g, the distributing conductors 162 and 163, common return conductor 164, brush 165 and ground 166. Also one side of each of the incandescent lamps 26b is connected via conductors 26d and distributing conductor 26e with a commutator ring 26f on shaft 154. The remaining side of each of the lamps 26b is connected via conductors 26g and distributing conductors 160 and 163 with the common return conductor 164 and thence to commutator ring 164', brush 165 and ground 166.

It will thus be seen that one side of all of the incandescent lamps in casing 155 is connected to the commutator rings on shaft 154 while the other side of all of said lamps is grounded through the common return lead 164, brush 165 and the ground 166.

Mounted on the instrument board of the aircraft adjacent the position indicator A is an auxiliary signal lamp 167, the purpose of which will be hereinafter set forth. To energize this lamp 167 one side thereof is connected via terminals 168 and 169 with ground brush 165 and the remaining side is connected with conductor 170 which connects with armature switch 171 in the selector mechanism hereinafter to be described.

To enable the finder A' to be rotated, shaft 154, (Fig. 11), is provided with a ring gear 173 adapted to mesh with the bevel gear 174 suitably journaled in bearings 175. Gear 174 is connected to a Cardan cable 176 which extends to the housing 178 of the control device V mounted on the steering wheel, as shown in Fig. 8 of the drawings. The free end of the cable 176 terminating in housing 178 is provided with a gear (not shown) adapted to mesh with a suitably arranged gear (not shown) controlled by the operating knob 179, of control device V, so that as said knob 179 is operated shaft 154 of inner casing 155 will be rotated, thus permitting orientation of the finder A' with reference to the landing field, as will be understood without further discussion.

To distribute electrical energy to the commutator rings and from the latter to the various incandescent lamps in casing 155 numbered 1a to 25a inclusive, cylindrical extension 151 is provided with a series of brushes numbered 1f to 25f inclusive, which are adapted to contact with the commutator rings numbered 1e to 25e inclusive. Brushes 1f to 25f inclusive are each connected to conductors designated 1g to 25g inclusive, the free ends of which are connected to armature switches designated 1h to 25h inclusive, which are located in the selector mechanism, hereinafter to be described. The commutator rings 27f and 26f coact with brushes 27g and 26g likewise mounted in the cylindrical portion 151 of casing 150. Brushes 27g and 26g are connected to conductors 27h and 26h, the free ends of which are connected with armature switches 27i and 26i in the selector mechanism, hereinafter to be described. The several conductors 1g to 25g and 27h and 26h inclusive, are enclosed in a suitable casing U', which extends from the position indicator to the selector mechanism. It will thus be apparent that the electrical energy brought to the brushes will be transmitted through the latter to the commutator rings and from the rings through the various incandescent lamps to the common return conductor 164 and thence through brush 165 to ground 166.

*Selector mechanism.*—Within the casing enclosing the selector mechanism Y are arranged (Fig. 12) twenty-eight A. C. relays disposed in groups numbered 1i to 25i and 27j, 26j and 171j. The respective relays are positioned so as to coact with armature switches 1h to 25h, 27i, 26i and 171i, whereby energization of the relays will cause the armature switches to engage their complemental stationary contacts numbered 1j to 25j and 27k, 26k and 171k, as clearly shown in Fig. 12 of the drawings.

To conduct electrical energy from the positive side of battery 180 to the several contacts above mentioned, stationary contacts 1j to 5j are connected to branch conductor 181; contacts 6j to 10j to branch conductor 182; contacts 11j to 15j to branch conductor 183; contacts 16j to 20j to branch conductor 184; contacts 21j to 25j to branch conductor 185; contacts 27k, 26k and 171k to branch conductor 186. These branch conductors 181 to 186 inclusive are connected to distributing conductor 187 extending from the positive side of a battery 180, the negative side of which is grounded at 189, as clearly shown in Fig. 12 of the drawings.

By virtue of these connections, when the respective armature switches 1h to 25h, 26i, 27i and 171i have been brought into engagement with their complemental stationary contacts 1j to 25j, 26k, 27k and 171k, electrical energy will be permitted to flow from the positive side of battery 189 through distributing conductor 187 to the branch conductors 181 to 186 and from these conductors to the stationary contacts 1j to 25j, 26k, 27k and 171k, armature switches 1h to 25h, 26i, 27i and 171i, and conductors 1g to 25g, 27h, 26h, to the brushes mounted on the position indicator U and to one side of signal lamp 167 via conductor 170 for a purpose hereinafter to be described.

To energize the various relays, each of which is responsive to a different audio frequency, said relays are connected to the output side of a conventional radio receiver Z, located aboard the aircraft and in a position where it may be readily tuned by the pilot. This connection is effected as follows:

Relays 1i to 5i are connected to branch conductors 190 and 191; relays 6i to 10i to branch conductors 192 and 193; relays 11i to 15i to branch conductors 194 and 195; relays 16i to 20i to branch conductors 196 and 197; relays 21i to 25i to branch conductors 198 and 199; relays 27j, 26j and 171j to branch conductors 200 and 201. The branch conductors 190 to 201 inclusive are connected to the distributing conductors 204 and 205 extending from the audio frequency output side of the receiver Z, whereupon the output of receiver Z at audio frequencies $N^1$ to $N^{28}$ will be distributed to the various relays to effect their selective operation, as will hereinafter appear.

According to the preceding circuit arrangement, reception of a signal by the receiver Z modulated at audio frequency $N^1$ will produce currents in the output distributing leads 204 and 205 of the receiver at the audio frequency $N^1$ and these currents will flow through all of the A. C. relays but will effect only the relay responsive to audio frequency $N^1$, namely relay 1i. Energization of relay 1i will cause said relay to attract its armature 1h and cause the latter to engage the complemental stationary contact 1j, thus permitting current to flow from battery 180 through conductor 187 to armature switch 1h, then through conductor 1g to brush 1f on the position indicator U. From brush 1f the current will flow to commutator ring 1e, thence through conductor 1d to one side of lamp 1b, and from the opposite side of said lamp through branch conductor 159 to the common return conductor 164, commutator ring 164', brush 165 and ground 166, thus completing the circuit of the incandescent lamp 1b and illuminating the area 1c on the finder or screen A'. In like manner audio frequencies $N^2$ to $N^{25}$ will cause the incandescent lamps 2b to 25b to be lighted and the areas 2c to 25c on finder A' to be illuminated as will be understood without further discussion. Similarly a radio signal at audio frequency $N^{26}$ will energize A. C. relay 26j to attract armature 26i of this relay and complete the circuit from battery 180, distributing conductor 187, branch conductor 186, stationary contact 26k, armature switch 26i, conductor 26h, brush 26g, commutator ring 26f, conductor 26e, branch conductors 26d to one side of the four incandescent lamps 26b in the compartments 26a. From the other side of the four lamps 26b the current will flow through the branch conductors 26g to the common return conductor 164, commutator ring 164', and thence to brush 165 and ground 166, to illuminate the four segmentally shaped green areas 26c on the finder a' representing the 1500 foot marker receiver stations. In like manner reception of a signal at audio frequency $N^{27}$ will energize the A. C. relay 27j and complete the circuit of battery 180, through the four incandescent lamps 27b to illuminate the four segmentally shaped blue areas 27c of the finder A', representing the one and a half mile marker receiver stations.

In order to afford an auxiliary danger signal for the pilot of the aircraft there is provided the signal lamp 167 controlled by the relay 171j which is responsive to signals modulated at audio frequency $N^{28}$. When energized by currents at audio frequency $N^{28}$, relay 171j will attract armature 171i and close the circuit from battery 180 to one side of signal lamp 167, via conductors 187, 186, stationary contact 171k, armature switch 171n, conductor 170, signal lamp 167 and from the other side of signal lamp 167 to ground 168 via conductor 169, thus completing the circuit of said lamp 167 and causing its illumination.

*Operation.*—Having described the structural and electrical details of this invention, its operation is as follows:

Assuming that an aircraft, flying at an altitude of 800 feet, is coming into landing field A; that radio receiver Z, aboard the aircraft has been tuned to the signal frequency of field transmitter 52 and that beams R and T (Fig. 6) are emanating from radiators 133 and 134 which latter are in electrical relation with short wave transmitters 135 and 136, adapted to transmit at the frequencies of 75,000 and 300,000 kilocycles respectively, and further assuming that with the aid of directional signals from the operator in signal tower 51 the aircraft has been flown across the field as it is located above receiver station 13 with beam T directed upon said station, as shown in Fig. 3 of the drawings.

Aircraft O being disposed above station 13, as in Fig. 3, radiant energy from beam T will excite antenna 31 of receiver 32 (Fig. 2), and since the latter is tuned to the frequency of beam T, high frequency currents will be set up in the receiver output circuit and these currents after rectification by rectifier 40, will energize relay 41 and actuate switch 42 to close the audio frequency output circuit of local oscillator 33, whereupon signals at audio frequency $N^{13}$ produced by oscillator 33 will flow over conductors 34 and 35 (extending from the audio frequency side C of compartment 28 to conductors 43—44, 45—46, 47—48, 49—50 to the audio frequency input terminals 127 and 128 of panel G located in control tower 51, (Fig. 9). From terminals 127 and 128 the signals will flow over conductors 110 and 111, switch J, conductors 116 and 117 into the signal and speech transmitting apparatus K, whereupon signals at the signal frequency of the field transmitter 52 but modulated at audio frequency $N^{13}$ will be transmitted from field transmitter 52, as will be understood without further discussion.

As the signals emanating from field transmitter 52 are picked up by receiver Z aboard the aircraft (Figs. 8 and 12), currents will be caused to flow in the output circuit of said receiver Z which includes audio frequency distributing leads 204 and 205, branch conductors 190 to 201 inclusive, and A. C. relays 1i to 25i, 26j, 27j and 171j of selector mechanism Y. None of the A. C. relays however, will be affected with exception of relay 13i which as hereinbefore stated, is responsive to signals at audio frequency $N^{13}$. When relay 13i has been energized, its armature switch 13h will be actuated to close a lamp circuit which extends from the positive pole of battery 180 to one side of incandescent lamp 13b, located in compartment 13a of the position indicator U and from the opposite side of said lamp 13b to ground 166 and from said ground to the grounded side of battery 180, (Fig. 12), thus completing the circuit of lamp 13b and illuminating the square 13c representing the field receiver station 13 on landing field A. Illumination of square 13c on the finder or screen A' informs the pilot that his aircraft is above square 13 on the landing field, as shown in Fig. 3.

As the aircraft without change of course, continues its flight across the landing field toward, let it be assumed, the north boundary, the radiant energy of beam T will successively excite the antennas 31 of field receiver stations 8 and 3, so that signals at the frequencies $N^8$—$N^3$ of the local oscillators 33, associated with these stations, will be fed into the signal and speech transmitting apparatus K at the control tower so as to effect modulation of audio frequency $N^8$—$N^3$ of the signals transmitted from apparatus K, via conductors 118 and 199 to the radiator system of the field transmitter 52. As the signals from field transmitter 52 modulated at audio frequencies $N^8$—$N^3$ are picked up by the receiver Z aboard the aircraft, currents will be set up in the audio frequency output reads 204 and 205, (Fig. 12), of said receiver Z and from leads 204 and 205 these currents will flow to the A. C. relays of selector mechanism Y to energize relays 8i and 3i responsive to frequencies $N^8$—$N^3$. When relays 8i and 3i have been energized, the circuit of battery 180 will be closed through the incandescent lamps 8b and 3b located in position indicator U, to light said lamps and illuminate squares 8c and 3c of the finder or screen A', thereby indicating to the pilot that the aircraft has successively passed over squares 8 and 3 on the landing field, as will be understood without further discussion.

After proceeding back and forth across the landing field several times to definitely locate the position of the aircraft relative to the various field receiver stations, let it be assumed that the pilot again heads the aircraft towards the north boundary. Upon passing this boundary and reaching a point 1500 feet therefrom radio beam R (the width of which corresponds to that of the landing field) (Figs. 4 and 5), will be directed upon marker receiver station 26.

The antenna 31 of station 26 when excited by the radiant energy of beam R will, as in the case of the stations previously referred to, effect transmission of signals from the field transmitter 52 at audio frequency modulation $N^{26}$. When signals modulated at the frequency $N^{26}$ are picked up by receiver Z aboard the aircraft, the currents set up in the output circuit of the receiver will be distributed to the A. C. relays in the selector mechanism Y to energize relay 26j, actuate its armature 26i and complete the circuits of the four lamps 26b in the position indicator U, to light said lamps and illuminate the segmentally shaped green areas 26c of the finder A', thus informing the pilot that the aircraft is directly over marker station 26, located at a point 1500 feet from the north boundary of the landing field.

Without change of course, the ship is flown to a point situated a mile and a half from marker receiver station 26 and at this point the beam R impinging antenna 31 of marker station 27 will excite said antenna and thereby cause the field transmitter 52 to transmit signals modulated at audio frequency $N^{27}$. As signals at this frequency are received by receiver Z aboard the aircraft, they will energize relay 27j and close the circuit of battery 180 through the four incandescent lamps 27b of the position indicator U to light said lamps and illuminate the four segmentally shaped blue areas 27c to indicate to the pilot that the aircraft is located above the mile and a half marker station 27. When these blue signals have been received by the pilot, the aircraft is caused to describe a 180° turn so that it will be headed back toward the north boundary, as shown in Figure 1 of the drawings. At the same time the pilot switches on the short wave transmitter 132 operating at a frequency of 300,000 kilocycles and projecting the beam P in the direction of the line of flight.

The landing beam P being coextensive with landing field A, as the aircraft heads at a suitable landing angle towards the ground, said beam will excite the antennae 31 of all the stations within its path and hence cause said stations to produce signals on the finder or screen A' of the position indicator U aboard the aircraft. These signals however, will be of short duration, because as the aircraft approaches the ground the beam will be narrowed so as to focus on but one or two stations, which will be indicated by the continuous illumination of the corresponding areas on the finder A', as will be understood without further discussion. Hence the pilot by directing the flight of the aircraft so that the beam continues to play on a selected station, establishes a landing beam by which the aircraft may be brought to a safe landing at known points on the field.

From the preceding discussion of the operation of the instant invention, it will be evident when the aircraft O is above any of the field stations 1 to 25 inclusive, the corresponding square of those designated 1c to 25c on the screen A' of the position indicator U, aboard the aircraft will be illuminated. When the aircraft passes above the field marker station 26 located at a point 1500 feet from the field boundary, the four segmentally shaped green areas of the finder A'' will be illuminated and as the aircraft passes the field marker station located a mile and a half from the 1500 foot marker station, the four segmentally shaped blue areas 27c of finder A' will be illuminated to inform the pilot that at this point the plane should be turned through a 180° angle and headed back toward the landing field preparatory to making a landing along the landing beam P radiating from the aircraft in the direction of its line of flight.

Conditions may arise when it would be extremely dangerous for the pilot to make a landing, as for instance, inundation of the landing field by a recent flood. In this event, in order to warn the pilot of the aircraft regarding the dangerous condition of the field, a danger signal lamp 167, mounted on the instrument board is illuminated. Assuming the hazardous field condition mentioned, the operator in the signal tower closes the switch L on panel G (Fig. 9) and completes the output circuit of oscillator M, so as to transmit signals from its output circuit at the frequency $N^{28}$. As the output of the oscillator M is connected via conductors 108 and 109 (Fig. 9), to conductors 110, said signals will flow from the conductors 108, 109, 110 and 111 to switch J, and through said switch via conductors 116 and 117 to the signal and speech apparatus K whereby the signals will be transmitted at a frequency of $N^{28}$.

The signals transmitted at frequency $N^{28}$ when picked up by receiver Z aboard the aircraft will be transmitted via the conductors 204 and 205 to the various A. C. relays in the selector mechanism Y, whereupon relay 171 will be energized to attract its armature 171i and complete the circuit from battery 180 to one side of signal lamp 167 via conductors 187, 186, contact 171k, armature 171i and conductor 170. From the other side of signal lamp 167 the current will flow via conductor 169 to ground 166, thus completing the circuit through lamp 167 to light said lamp and warn the pilot that conditions on the field preclude a safe landing.

In conclusion, it will be apparent that when the landing field and the aircraft have been equipped as hereinabove stated, it is possible for the pilot of an aircraft to be guided solely by the indications on the position indicator U aboard the aircraft in definitely locating the position of said aircraft with reference to one or more field stations on the landing field and to select a particular station for the purpose of making a landing and to make this selection without regard to atmospheric or other conditions which heretofore have made landing, under conditions of poor or of no visibility, extremely hazardous.

Having described my invention, what I claim and wish to secure by Letters Patent is:

1. A navigational guide system comprising a landing field laid out in a series of geographic divisions, a field receiver station located in each division, each receiver station including a signal receiving device responsive to a predetermined frequency, and a local audio frequency oscillating unit adapted to oscillate at a certain audio frequency value and to be set in operation by said device, a field transmitter adapted to transmit at a predetermined carrier frequency, means in electrical relation with the field receiver stations and with said field transmitter to modulate the carrier frequency of the latter at different audio frequency values, determined by the audio frequency output of the local oscillator unit associated with each of said receiver stations, an aircraft, means aboard the aircraft for transmitting a radio beam normal to the line of flight of the aircraft, said beam having a signal frequency corresponding to that to which said signal receiving devices are responsive whereby as the aircraft crosses said landing field the beam will successively sweep the divisions thereof, and energize the receiver station in each division, a signal receiving system aboard the aircraft including means for receiving the signals transmitted from the field transmitter and means for translating the audio frequency values of said signals into visual signals aboard the aircraft, indicating the particular receiver station upon which the beam from the aircraft is directed at the time the visual signal is produced aboard said aircraft.

2. A navigational guide system comprising a landing field laid out in a series of geographic divisions of predetermined dimensions, a field receiver station arranged in each division, each of said receiver stations including a signal receiving device responsive to a predetermined frequency, a local audio frequency oscillator unit adapted to oscillate at a certain audio frequency value and to be set in operation by said device, a field transmitter adapted to transmit at a predetermined carrier frequency, means in electrical relation with the field receiver stations and with the field transmitter to modulate the carrier frequency of the latter at different audio frequency values, determined by the audio frequency oscillating units at each of said receiver stations, an aircraft, means aboard the aircraft for transmitting a radio beam having a conical radiation pattern whereby when said aircraft is at a predetermined altitude and immediately above a receiver station, the spread of the beam will be such as to cover but one of the squares of said landing field, said beam having a signal frequency corresponding to that to which the field receiver stations are responsive, and being directed normal to the line of flight of said aircraft whereby as the latter crosses said landing field the beam will successively cover each square thereon to energize its receiver station, a signal receiving system aboard the aircraft including means for receiving signals from the field transmitter and means for transmitting the audio frequency values of said signals to produce visual signals aboard the aircraft indicating the particular receiver station upon which the beam from the aircraft is directed at the time the visual signal is received.

3. A navigational guide system comprising a landing field laid out in a series of squares of predetermined dimensions, a field receiver station arranged in each square, each of said receiver stations including a signal receiving device responsive to a predetermined frequency, and a local audio frequency oscillator unit adapted to oscillate at a certain audio frequency value and to be set in operation by the response of said device, a field transmitter adapted to transmit at a predetermined carrier frequency, means in electrical relation with the field receiver stations and with said field transmitter to modulate the carrier frequency of the latter at different audio frequency values, determined by the audio frequency oscillating units of each of said receiver stations, an aircraft, means aboard the aircraft for transmitting a radio beam having a radiation pattern whereby when said aircraft is at a predetermined altitude and immediately above a receiver station the spread of said beam will be such as to cover but one of the squares of said landing field, said beam having a frequency corresponding to that to which the field receiver stations are responsive and being directed normal to the line of flight of said aircraft, whereby as the latter crosses said landing field the beam will successively cover each division to energize its receiver station, a signal receiving system aboard the aircraft including a receiver for receiving the signals transmitted from the field transmitter, said receiver embodying an output circuit, and a position indicator in the output circuit of said receiver, said position indicator including a translucent screen laid out in a series of squares corresponding to those of the landing field, an illuminating device in connection with each square of said screen and selectively responsive to the audio frequency values of the signals transmitted over the ouput circuit of said receiver to illuminate a selected square on the screen corresponding to the squares of the landing field upon which the radio beacon of the aircraft is directed at the time the visual signal is received.

4. A navigational guide system comprising a landing field laid out in a series of squares of predetermined dimensions, a field receiver station arranged in each square, each of said receiver stations including a signal receiving device responsive to a predetermined frequency, and a local audio frequency oscillator unit adapted to oscillate at a certain audio frequency value and to be set in operation by said device, a field transmitter adapted to transmit at a predetermined carrier frequency, means in electrical relation with the field receiver stations and with said transmitter to modulate the carrier frequency of the latter at different audio frequency values, determined by the audio frequency oscillating units of each of said receiver stations, an aircraft, means aboard the aircraft for transmitting a radio beam having a conical radiation pattern whereby when said aircraft is at a predetermined altitude and immediately above a receiver station, the spread of said beam will be such as to cover but one of the squares of said landing field, said beam having a frequency corresponding to that to which the field receiver stations are responsive and being directed normal to the line of flight of said aircraft, whereby as the latter crosses said landing field the beam will successively sweep each of its squares to energize the receiver stations, a signal receiving system aboard the aircraft including a receiver for receiving the signals transmitted from the field transmitter, said receiver having an output circuit, a position indicator, said position indicator including a rotatable translucent screen adapted to be oriented with respect to the landing field, said screen being divided into a series of squares corresponding in number to those of the landing field, and an illuminating device in connection with each of the squares of said screen and selectively responsive to the audio frequency values of the signals transmitted over the output circuit of said receiver, whereby to illuminate a square on the screen representing the square of the landing field upon which the radio beacon from the aircraft is directed at the time the visual signal is received.

5. A navigational guide system comprising a landing field laid out in a series of squares of predetermined dimensions, a field receiver station centrally located in each square, a field marker station exterior of each of the landing field boundaries and at a predetermined point with respect thereto, each of said field receiver stations and said marker stations including a signal receiving device responsive to signals of a predetermined frequency, and a local audio frequency oscillating unit adapted to oscillate at a certain audio frequency value and to be operated by the response of the signal receiving device, a field transmitter adapted to transmit at a predetermined carrier frequency, means in electrical relation with the field receiver stations, the field marker stations and the field transmitter to modulate the carrier frequency of the latter at different audio frequency values, determined by the audio frequency oscillating units of the receiver and marker stations, an aircraft, means aboard said aircraft for transmitting radio beams normal to line of flight of said aircraft, one of said beams having a frequency corresponding to that to which the receiver stations are responsive, the other beam having a frequency corresponding to that to which the marker stations are responsive, whereby as said aircraft crosses said landing field the beams will successively sweep the squares thereof to successively energize said receiver and said marker stations, a signal receiving system aboard the aircraft, including means for receiving the signals transmitted from the field transmitter and means for translating the audio frequency values of said signals into visual signals aboard the aircraft indicating the particular field receiver station or marker receiver station upon which the beams of the aircraft are directed at the time the visual signal is received aboard the aircraft.

6. A navigational guide system comprising a landing field laid out in a series of squares of predetermined dimensions, a field receiver station centrally located in each square, a field marker station situated exterior of each of the landing field boundaries and at a predetermined point with respect thereto, each of said field receiver stations and said marker stations including a signal receiving device responsive to signals of a predetermined frequency, and a local audio frequency oscillating unit adapted to oscillate at a certain audio frequency value and to be operated by the response of the signal receiving device, a field transmitter adapted to transmit at a predetermined carrier frequency, means in electrical relation with the field receiver stations, the field marker stations and the field transmitter to modulate the carrier frequency of the latter at different audio frequency values, determined by the audio frequency oscillating units of the receiver and marker stations, an aircraft, means aboard the aircraft for transmitting radio beams normal to its line of flight, one of said beams having a frequency corresponding to that to which the receiver stations are responsive, the other of the beams having a frequency corresponding to that to which the marker stations are responsive, whereby as said aircraft crosses said landing field the beams will successively sweep the squares thereof and successively energize said receiver and said marker stations, a signal receiving system aboad the aircraft including means for receiving the signals transmitted from the field transmitter and means for translating the audio frequency values of said signals into visual signals aboard the aircraft indicating the particular field receiver station or marker receiver station, upon which the beams of the aircraft are directed at the time the visual signal is received aboard the aircraft, said translating means including a receiver for receiving signals transmitted from the field transmitter, said receiver having an output circuit, a position indicator included in the output circuit of said receiver, said position indicator including a rotatable translucent screen adapted to be oriented with respect to the landing field and laid out in a series of squares to provide a facsimile of the landing field illuminating devices to the rear of the screen and in connection with each of its squares, said devices being selectively responsive to the different audio frequency values transmitted over the ouput circuit of said receiver, whereby to illuminate a square on the screen corresponding to the square on the landing field upon which the beams of said aircraft are directed at the time the signal is received aboard the aircraft.

7. A navigational guide system comprising a landing field laid out in a series of squares of predetermined dimensions, a field receiver station arranged in each square, a pair of marker stations situated exterior of and in predetermined spaced relation with respect to each other and to each of the boundary lines of said landing field, said field receiver stations and said marker stations including a signal receiving device responsive to a predetermined frequency, and a local audio frequency oscillator unit adapted to oscillate at a certain audio frequency value and to be operated by the response of said signal receiving device, a field transmitter adapted to transmit at a predetermined carrier frequency, means in electrical relation with the field receiver stations, the field marker stations and the field transmitter to modulate the carrier frequency of the latter at different audio frequency values determined by the audio frequency oscillator units of the field receiver and marker stations, an aircraft, means aboard the aircraft for transmitting a pair of radio beams normal to the line of flight of said aircraft, one of said beams having a radiation pattern, the spread of which is coextensive with the width of the field when the aircraft is disposed at a predetermined altitude with respect to said field, the other of said beams having a conical radiation pattern, the spread of which when the aircraft is at a certain altitude will be such as to cover but one of the squares of said field, one of said beams corresponding in frequency to that to which the field receiver stations have been tuned, the other of said beams having a frequency corresponding to that to which the marker stations have been tuned, whereby as said aircraft crosses said landing field at a predetermined altitude, said beams will energize the field receivers and field marker stations, a signal receiving system aboard the aircraft including a receiver having an output circuit, a position indicator included in said output circuit comprising a rotatable translucent screen adapted to be oriented with respect to the landing field, said screen being laid out in a series of squares surrounded by colored segmentally shaped areas, the squares of the screen corresponding to those of the landing field and representing the receiver stations and the colored segmentally shaped areas representing the field marker station, illuminating devices in connection with the squares and segmentally shaped areas of said screen, said illuminating devices being selectively controlled by the diffferent audio frequency values generated in the output circuit of said receiver, whereby to selectively illuminate the squares and said segmentally shaped areas of said screen when the beams from said aircraft are directed upon the field receiver or field marker stations.

8. A method of transmitting and translating directive radio beacon signals, consisting in sweeping a landing field with a beam of radiant energy emanating from an aircraft and directed in a plane normal to its line of flight, utilizing the sweep of the beam across the surface of the landing field to impinge a series of beam responsive points within the boundaries of the field, causing the impingement of the beam with the points to produce a plurality of signals, each signal having a predetermined frequency to identify geographically the particular point impinged by the beam and then employing said signals to visualize the beam responsive points aboard an aircraft whereby to indicate the position of the aircraft relative to the respective points at the time each visualization is received.

9. A method of transmitting and translating directive radio beacon signals, consisting in sweeping a landing field with a beam of radiant energy emanating from an aircraft and directed in a plane normal to the line of flight, utilizing the sweep of the beam across the surface of the landing field to successively impinge a series of beam responsive points within the boundaries of the field, causing the impingement of the beam with the points to produce a series of signals, each signal having a different frequency to identify geographically the point impinged by the beam and then employing said signals to visualize successsively the beam responsive points aboard an aircraft whereby to indicate the position of the aircraft relative to the respective points at the time each visualization is received.

10. A method of transmitting and translating directive radio beacon signals, consisting in sweeping a landing field with a beam of radiant energy emanating from an aircraft, the beam having a characteristic pattern and being directed in a plane normal to its line of flight, utilizing the sweep and pattern of the beam to impinge selectively a series of beam responsive points within the boundaries of the landing field, causing the impingement of the beam with the points to produce a series of signals, each signal having a different frequency to identify geographically the point impinged by the beam and then employing the signals to visualize successively the beam responsive points aboard an aircraft whereby to indicate the position of the aircraft relative to the respective points at the time each visualization is received.

11. A method of transmitting and translating directive radio beacon signals, consisting in sweeping a landing field with a beam of radiant energy emanating from an aircraft flying at a predetermined altitude with respect to the field, the beam having a conical pattern and being directed in a plane normal to the line of flight, utilizing the sweep and pattern of the beam across the surface of the landing field to impinge selectively a series of beam responsive points within the boundaries of the field, causing the impingement of the beam with the points to produce a series of signals, each signal having a different frequency to identify geographically the point impinged by the beam and then employing said signals to visualize successively the beam responsive points aboard an aircraft whereby to indicate the position of the aircraft relative to the respective points at the time each visualization is received.

12. A method of transmitting and translating directive radio beacon signals, consisting in sweeping the landing field with a pair of radiant energy beams emanating from an aircraft and directed normal to its line of flight, utilizing the sweep of the beams across the surface of the landing field to impinge a series of beam responsive points within and without the boundaries of the landing field, causing the impingement of the beam with the points to produce a series of signals, each signal having a different frequency to identify the location of the point with reference to the boundaries of the field and then employing the signals to visualize the beam responsive points aboard an aircraft whereby to indicate the position of the aircraft relative to the respective points at the time each visualization is received.

13. A method of making a blind landing consisting in directing a beam of radiant energy from an aircraft and in the direction of its line of flight, flying the aircraft to a predetermined position with reference to the boundary line of a flying field, indicating said position in color aboard the aircraft, heading the aircraft toward the landing field so as to direct its beam upon a series of beam responsive points within the boundaries of the landing field to produce a plurality of signals, each signal having a different frequency to identify the position of the points with reference to said boundaries, employing the signals to visualize the points aboard an aircraft and while maintaining visualization of the points, directing the aircraft along the beam to the visualized points on the landing field.

14. A navigational guide system comprising a landing field laid out in a series of geographic divisions, an element responsive to radiant energy of a predetermined frequency and located in each division, a generator for producing alternating current of a predetermined frequency associated with each of said radiant energy responsive elements and operable by the response of said element, said generators producing currents of different frequencies, a field transmitter in electrical relation with the respective generators and adapted to transmit the signals produced by said generators, an aircraft, means for transmitting a radio beacon from the aircraft, said beacon having a frequency within the resonant response of said radiant energy responsive elements, means in connections with the aircraft transmitter for directing the radio beacon in a plane normal to the line of flight of the aircraft, whereby as the latter crosses said landing field the beam will successively sweep the geographic divisions thereof and energize the radiant energy responsive element in each of said divisions, a signal receiving system aboard the aircraft including means for receiving the signals transmitted by the field transmitter and means for translating the values of said signals to produce visual signals aboard the aircraft indicating the particular radiant energy responsive element upon which the beacon from the aircraft is directed at the time the visual signal is produced aboard said aircraft.

EDWARD M. SORENSEN.